May 11, 1926.
W. T. SMITH ET AL
1,584,675
WHEEL PULLER
Filed June 27, 1924
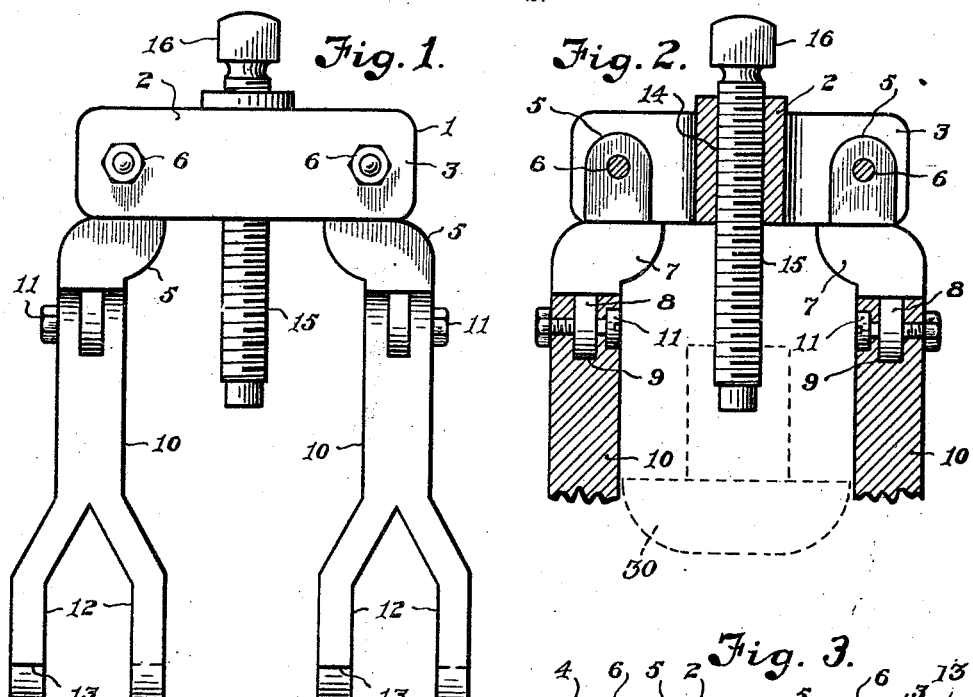
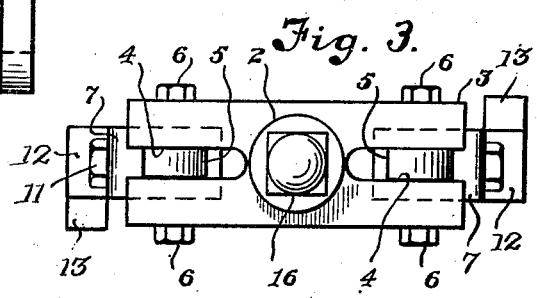
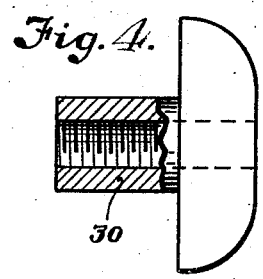
William T. Smith
Henry Keyton
INVENTOR
BY Victor J. Evans
ATTORNEY
WITNESS:

Patented May 11, 1926.

1,584,675

UNITED STATES PATENT OFFICE.

WILLIAM T. SMITH AND HENRY KEYTON, OF COATESVILLE, PENNSYLVANIA.

WHEEL PULLER.

Application filed June 27, 1924. Serial No. 722,765.

This invention relates to a wheel or gear puller, and an object of the invention is to provide a convertible combination puller particularly designed for use in connection with motor vehicles, and one which is adjustable for varying its scope of engagement with various sized wheels, gears or the like, so as to permit the single device to be used in connection with the wheels, gears and the like, of a motor vehicle, and to permit it to take the place of practically four similar devices, such as are at present used.

A further object of the invention is to provide a device as specified, which includes a carrying head having gripping legs pivotally connected thereto which are offset laterally, relative to their connecting portions to permit variation of the range or gripping scope of the legs by adjustment of their connection with the carrying body.

Other objects of the invention will appear in the following detail description, and in the accompanying drawings wherein:

Figure 1 is a side elevation of the improved wheel or gear puller.

Figure 2 is a vertical section.

Figure 3 is a top plan of the improved wheel puller.

Figure 4 is a detail view of an anchor brace plate used in connection with the improved wheel puller.

Referring more particularly to the drawings, the improved wheel puller comprises a yoke or carrying body 1 which includes the central portion 2 in the laterally extending arm portions 3 which are split longitudinally, as shown at 4. The inner ends of the slots 4 are rounded, as clearly shown in Figure 3 of the drawings. Leg carrying members 5 are pivotally connected by means of suitable bolts 6 to the yoke 2 and they have offset body portions 7 from which tongues 8 depend. The tongues 8 engage in the recesses 9 in the gripping arms 10, to permit firm connection between the gripping arms and the carrying members 5.

The legs 10 are connected by means of bolts 11 to the tongues 8, as clearly shown in Figure 2 of the drawings. The outer free ends of the legs 10 are bifurcated, forming arms 12 which have their outer terminals laterally turned to provide oppositely extending hooks 13.

The center 2 of the yoke 1 is provided with a threaded bore 14 through which a feed screw 15 extends. The head 16 of the feed screw is shaped to permit attachment thereto of a ratchet wrench or other suitable wrench, for rotating the screw 15 to operate the wheel or gear puller.

Figure 4 of the drawings, an anchor brace plate 30 is illustrated, which is adapted for use in connection with the yoke 2 for pushing or pulling bushings into or out of place.

By reversing the positions of the leg carrying members 5, it will be seen that the distance between the legs may be varied which will vary their scope of operation and enable them to be used in connection with gears, wheels, or the like, of different sizes.

It is, of course, to be understood, that the invention may be constructed in various other manners and the parts associated in different relations, and therefore, we do not desire to be limited in any manner, except as set forth in the claim hereunto appended.

What we claim is:

In a device as set forth, a yoke, a feed screw threadably carried thereby, leg carrying members detachably and pivotally connected to said yoke, gripping legs pivotally attached to said carrying members and having their outer ends bifurcated to form diverging arms, and laterally bent hooks on the ends of said arms and extending in opposite directions.

In testimony whereof we affix our signatures.

WILLIAM T. SMITH.
HENRY KEYTON.